United States Patent [19]

Deley et al.

[11] Patent Number: 4,895,412

[45] Date of Patent: Jan. 23, 1990

[54] MOTOR-VEHICLE SEAT HAVING LATERAL WINGS

[75] Inventors: Serge Deley, Seloncourt; Francois Fourrey, Montbeliard, both of France

[73] Assignee: ECIA - Equipements Et Composants Pour L'Industrie Automobile, Audincourt, France

[21] Appl. No.: 263,942

[22] Filed: Oct. 28, 1988

[30] Foreign Application Priority Data

Nov. 5, 1987 [FR] France .................... 87 15363

[51] Int. Cl.$^4$ .................................... A47C 7/46
[52] U.S. Cl. ........................... 297/284; 297/459; 297/460
[58] Field of Search ............... 297/284, 459, 458, 460

[56] References Cited

U.S. PATENT DOCUMENTS

| 4,462,635 | 7/1984 | Lance | 297/284 |
|---|---|---|---|
| 4,500,136 | 2/1985 | Murphy et al. | 297/284 |
| 4,557,444 | 8/1985 | Maruyama | 297/284 |
| 4,636,000 | 1/1987 | Nishino | 297/284 |
| 4,673,212 | 6/1987 | Mayer | 297/284 |

FOREIGN PATENT DOCUMENTS 2740268  3/1979  Fed. Rep. of Germany ...... 297/284

Primary Examiner—Francis K. Zugel
Attorney, Agent, or Firm—Sughrue, Mion, Zinn, Macpeak & Seas

[57] ABSTRACT

Motor-vehicle seat having lateral wings which each comprise a wing wire (7) fastened directly to the frame (3) of the seat. The angular position of each wing is adjusted by means of a control screw (17) and an adjusting member, of which a part forming a nut (26) moves along on the control screw and of which a part forming a hook (24, 25) is fastened directly to the wing wire.

9 Claims, 4 Drawing Sheets

MOTOR-VEHICLE SEAT HAVING LATERAL WINGS

The present invention relates to a motor-vehicle seat equipped with lateral wings on its back and/or its sitting surface. It is usually necessary to provide the occupant of the seat with a possibility of adjusting the angular position of the wings, in such a way that the seat can be matched to the exact physical shape of the occupant.

There are already many known mechanisms which make it possible to adjust the angular position of the lateral wings of a seat, but the disadvantage of these mechanisms is that they comprise a large number of components, the respective connections of which easily become slack, and the conventional seats therefore have the disadvantage that they do not allow their components to be adjusted easily.

The object of the present invention is to provide a motor-vehicle seat, of which the device for adjusting the lateral wings comprises a small number of components and which is therefore inexpensive, easy to operate and relatively simple to assemble.

In fact, the subject of the invention is a motor-vehicle seat which, on at least one lateral element of its frame, has a wing wire pivoting at its two ends relative to a supporting element and connected to a means for adjusting its angular position, movable axially on a rotary control screw carried by the supporting element, characterized in that the ends of the wing wire are mounted pivotally in slots made in a lateral element of the frame, and in that the adjustment means comprises a part forming a hook, engaging directly onto the wind wire, and a part forming a nut, moving along on the corresponding control screw.

According to other characteristics:

The wind wire has, in its middle part, an offset for receiving the hook-forming part of the adjusting member;

The hook-forming part of the adjustment means has two hooks which are located on either side of an elastic strip for bearing on the corresponding wing wire and intended for keeping the ends of the wire in position in the slots;

The control screws of each of the wing wires are integral in terms of rotation with a transmission cable which connects them.

The very simple adjustment device makes it possible to adjust the two wings simultaneously by means of a simple operation, so that the spacing of the wings corresponds to the dimension desired by the user.

The invention will be described in more detail below with reference to the accompanying drawings which are given purely by way of examples and in which:

FIG. 3A is a view of an alternative version of the locking catch of FIG. 3;

The adjustable lateral wings of a seat back and/or of a sitting surface are generally produced in the same way. Only seat-back wings will therefore be described below for the sake of simplification, the sitting-surface wings being similar.

Figure 1:
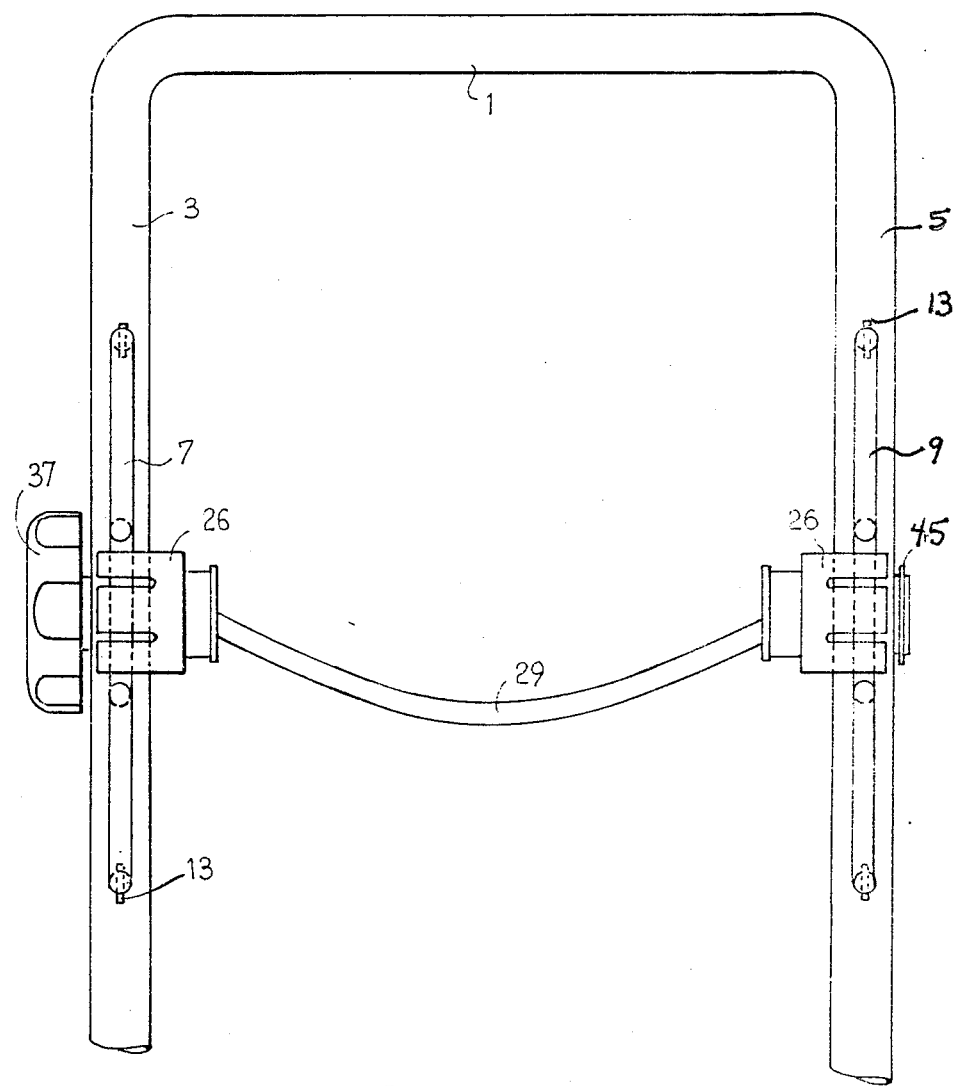
FIG. 1 is a general view of the adjustment device mounted on a seat frame.

FIG. 1 shows a vehicle-seat back comprising a frame tube 1 bent in the form of a U, the lateral elements 3, 5 of which each support a wing wire 7, 9 respectively.

Figure 2:
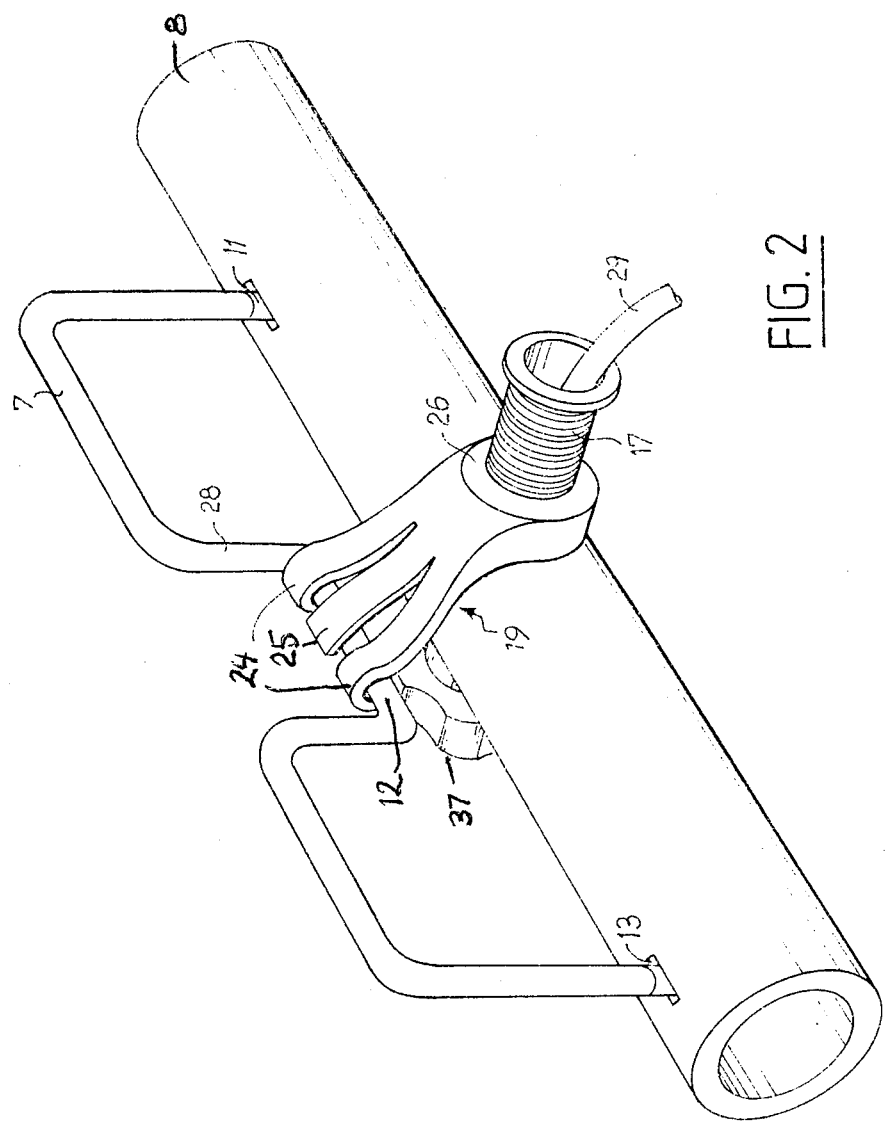
FIG. 2 is a perspective view of a first embodiment of an adjusting member fastened to a wing wire.

According to the invention, each lateral frame element 3, 5 has two holes or slots 11, in which the ends 13 of the wing wires 7, 9 are fastened. The slots 11 have a rectangular cross-section, and the ends 13 of the wing wires 7, 9 are flattened correspondingly, so that, after the wires have been put in place by being inserted vertically, the round end of each wing wire 7, 9 comes up against the respective lateral frame element. In the embodiment illustrated, the wing wires 7, 9 are in the form of an upturned U (FIGS. 2 and 3) and project from their respective lateral frame elements 3, 5. They have, in their substantially middle part, an offset 12 directed inwards towards the frame.

Since the means for adjusting the angular position of each of the wing wires are similar, only one of these, for example that connected to the wing wire 7, will be described.

The means for adjusting the angular position of the wing wire 7 consists of a control screw 17 mounted directly on the lateral frame element 3 and of an adjusting member 19 mounted axially movably on the screw 17 and being fastened to the wing wire 7. The adjusting member designated as a whole by 19 consists of a part forming a hook, hooking directly onto the wing wire at the location of the offset 12, and a part forming a nut 26, preferably in one piece with the other part and moving axially along on the control screw 17.

The part forming a hook comprises two hooks 24 located on either side of an elastic strip 25 which comes to bear on the wing wire 7, in order to keep the ends 13 of the said wing wire in position in the slots 11 of the lateral frame element 3. The hooks 24 engage respectively onto the wing wire 7 in the offset 12, at the same time surrounding the wire over more than half a circumference, in such a way that, when the wings are moved away from one another, they push the wing wire outwards and, when the wings are brought towards one another, they pull the wing wire inwards, so that there is no relative movement between the hooks and the wing wire.

The longitudinal movement of the hook-forming part of the adjusting member is limited by the lateral parts 28 of the offset 12 of the wing wire. The elastic strip 25 remains bearing on the wing wire 7, whatever the angular position of the latter, thus keeping the ends 13 of this wire firmly engaged in the slots 11 of the frame element 3.

Figure 3:
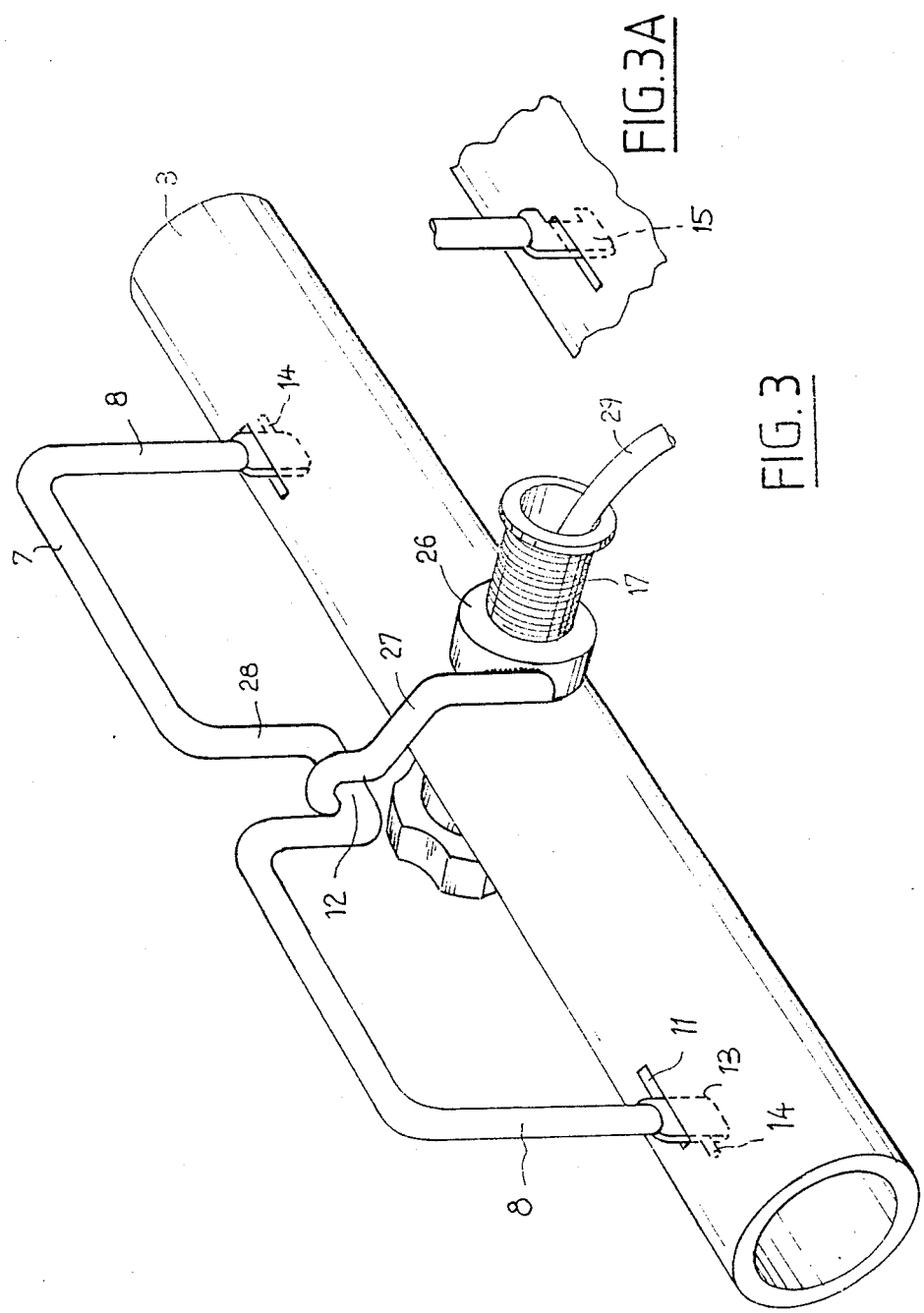
FIG. 3 is a perspective view of a second embodiment of the adjusting member.
Figure 4:
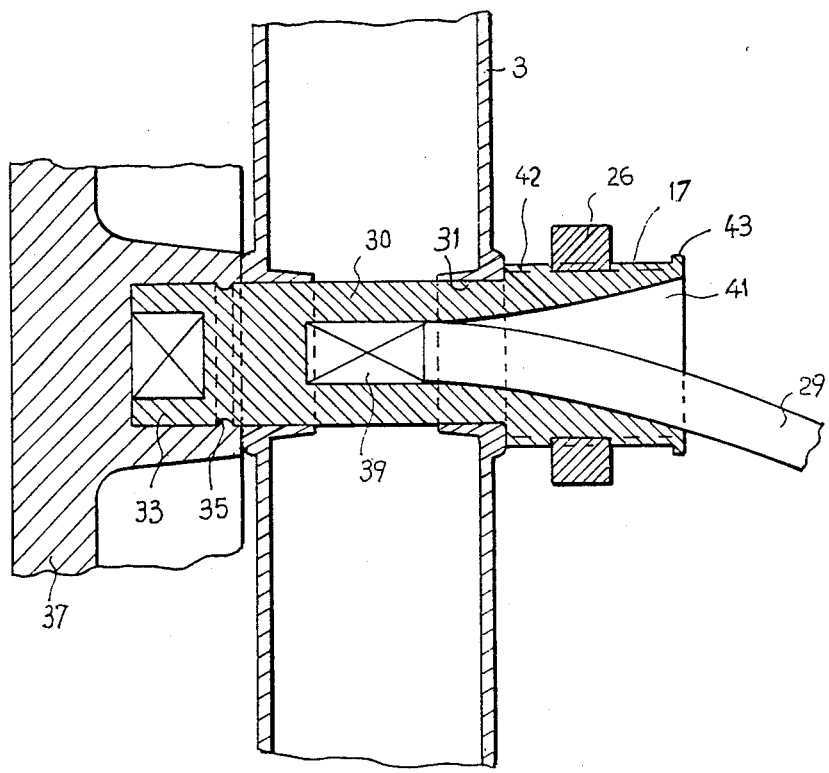
FIG. 4 is a sectional view of the control screw mounted on the frame.

According to an alternative embodiment of the adjustment means, illustrated in FIGS. 3 and 3A, the ends 13 of the wing wire have a catch for radial locking in position in the corresponding slot 11. This catch consists either of a peg 14 projecting towards the outside of the wire or of a notch 15 open outwards. In this case, the wing wire 7 is mounted on the frame element 3 under tension by utilizing the elasticity of its vertical parts 8. When the ends 13 have penetrated into the slots 11, the peg 14 or the lower edge of the notch 15, as appropriate, comes to bear on the inner face of the frame element at the end of the slot 11, preventing the ends 13 from coming out of the slots and thus ensuring a radial retention of the wing wire 7.

The member 19 in that case need not have an elastic strip. As shown in FIG. 3, it can even have only a single hook 27 fastened by any suitable means to the nut 26 or in one piece with the latter. This hook, like the hooks 24, is engaged onto the wing wire in a central offset 12 and surrounds this wire over more than half a circumference, so that it is strictly fixed to it and drives it in its movements.

Whatever the adjustment means used for the wing wire, it is possible to mount the same adjustment means symmetrically on the wing wire 9, and the two means are connected by a flexible cable 29 fastened inside each of the control screw 17.

Each control screw 17 is extended by a shank 30 which passes through the frame element 3 and which pivots in two holes 31 made in this frame element. The holes can be made by flow drilling in a recommended way.

The screw 17, at its end located outside the seat, opposite the nut 26, has a flat 33 and an annular groove 35, making it possible both to index an operating knob 37 in terms of rotation and to retain it in position after the latter has been engaged on the control screw. The outer face of the screw has a thread 42, onto which is engaged the nut-forming part 26 of the adjustment means, and the screw terminates in an abutment 43 for stopping the translational movement of the said nut.

Preferably formed inside this screw is a square cutout 39, into which can enage the corresponding square end of the connecting cable 29 which is thus strictly integral with the screw in terms of rotation. This square cutout 39 is completed by a frustoconical cutout 41 widening towards the inside of the profile and allowing the connecting cable 29 to start its curvature from inside the screw.

When an adjustment of the two sides of the seat element is carried out, one of the screws, for example the screw mounted on the frame element 5, has no operating knob, but a circlip 45 placed in the annular groove in order to retain the screw in terms of translational movement. The direction of the screw pitches of the control screw and of the nut of the adjustment means mounted on the wing wire 9 of the lateral frame element 5 are reversed in relation to those of the adjustment means mounted on the lateral frame element 3.

The means for adjusting the inclination of the lateral wings function as follows.

When the operating knob 37 is actuated in a first direction of rotation, the two nuts 26 of the adjustment means move away from one another, being driven by means of the screws 17 connected to one another by the flexible connecting cable 29, thus causing the respective wing wires 7, 9 to tilt outwards. Likewise, when the operating knob 37 is actuated in the other direction of rotation, the nut-forming parts 26 of the two adjustment means come towards one another, thus causing the inward tilting of the wing wires 7 and 9 and therefore the mutual approach of the lateral wings.

The two lateral wings of the seat back and/or of the sitting surface can thus be placed exactly in the desired position by means of a simple operation of the control knob 37. The occupant of the seat can therefore adjust the position of these wings at any moment and give the seat the shape which he considers the most comfortable.

It is clear that, since the device is perfectly symmetrical, the operating knob can be mounted on the left-hand lateral frame element, as shown, or on the right-hand frame element, depending on the uses and especially on the position of the seat in the vehicle.

We claim:
1. A motor vehicle seat comprising:
a sitting surface and a seat back, each having a frame comprising two lateral elements, at least one frame having wing wires, each of said wing wires comprising a central portion and two ends which are pivotally mounted in slots of the corresponding lateral element; and
adjusting means for adjusting an angular position of at least one wing wire;
said adjusting means comprising:
an offset in a middle part of said central portion; and
an adjusting member having a first part, forming a hook engaging directly onto said offset and surrounding said one wing wire over more than half a circumference thereof, and a second part forming a nut movable axially on a rotary control screw axially fixed in the lateral element.

2. Motor-vehicle seat having, on at least one lateral element (3, 5) of its frame (1), a wing wire (7, 9) pivoting at its two ends (13) relative to a supporting element and connected to a member (19) for adjusting its angular position, movable axially on a rotary control screw (17) carried by the supporting element, characterized in that:
the ends (13) of each wing wire (7, 9) are mounted pivotally in slots (11) made in a lateral element of the frame (3, 5);
each adjusting member (19) comprises a part forming a hook (24, 27), engaging directly onto the corresponding wing wire (7, 9), and a part forming a nut (26), moving along on the corresponding control screw (17); and
the hook-forming part of the adjusting member (19) comprises at least two hooks (24) which are located on either side of an elastic strip (25) for bearing on said wing wire and intended for keeping the ends (13) of said wing wire in position in the slots (11) of the frame.

3. Seat according to claim 1, characterized in that the wing wire (7, 9) has, in its middle part, an offset (12) for receiving the hook-forming part (24, 27) of the adjusting member.

4. Seat according to claim 1 or 3, characterized in that each wing wire (7, 9) has a catch for the radial locking of each of its ends (13) inside the corresponding slot (11).

5. Seat according to claim 4, characterized in that the locking catch consists of a peg (14) projecting towards the outside of the wire and coming to bear on the inner face of the lateral frame element.

6. Seat according to claim 4, characterized in that the locking catch consists of the lower edge of a notch (15) open towards the outside of the wire and coming to bear on the inner edge of the slot (11).

7. Seat according to claims 1 or 2, characterized in that a transmission cable interconnects the control screws, and in that the control screws (17) are integral in terms of rotation with said transmission cable (29).

8. Seat according to claims 1 or 2 characterized in that said wing wire is mounted pivotally on the lateral element of the frame of the seat back.

9. Seat according to claims 1 or 2 characterized in that said wing wire is mounted pivotally on the lateral element of the frame of the sitting surface.

* * * * *